United States Patent [19]
Nola

[11] Patent Number: 4,469,998
[45] Date of Patent: Sep. 4, 1984

[54] THREE-PHASE POWER FACTOR CONTROLLER WITH INDUCED EMF SENSING

[75] Inventor: Frank J. Nola, Huntsville, Ala.

[73] Assignee: The United States of America as represented by the Administrator of the National Aeronautics and Space Administration, Washington, D.C.

[21] Appl. No.: 450,319

[22] Filed: Dec. 16, 1982

[51] Int. Cl.³ ............................................. H02K 17/04
[52] U.S. Cl. .................................... 318/729; 318/802
[58] Field of Search ................................ 318/798–802, 318/809–811, 314, 317, 729, 767, 345 CB, 438

[56] References Cited

U.S. PATENT DOCUMENTS

| | | | |
|---|---|---|---|
| 4,052,648 | 10/1977 | Nola | 318/810 |
| 4,379,258 | 4/1983 | Sugimoto | 318/729 |
| 4,388,578 | 6/1983 | Green | 318/729 |

FOREIGN PATENT DOCUMENTS 8002895 12/1980 European Pat. Off. ............ 318/729

*Primary Examiner*—E. A. Goldberg
*Assistant Examiner*—A. Evans
*Attorney, Agent, or Firm*—Joseph H. Beumer; John R. Manning; Leon D. Wofford, Jr.

[57] ABSTRACT

A power factor controller for an A.C. induction motor (10) is provided which is of the type comprising thyristor switches (110), (111) and (112) connected in series with the motor, phase detectors (122), (124) and (126) for sensing the motor current and voltage and providing an output proportional to the phase difference between the motor voltage and current, and a control circuit, responsive to the output of the phase detector and to a power factor command signal, for controlling switching of the thyristor. The invention involves sensing the induced emf produced by the motor during the time interval when the thryistor is "off" and for producing a corresponding feedback signal for controlling switching of the thyristor. The sensed emf is also used to enhance "soft" starting of the motor.

14 Claims, 10 Drawing Figures

4,469,998

THREE-PHASE POWER FACTOR CONTROLLER WITH INDUCED EMF SENSING

ORIGIN OF INVENTION

The invention described herein was made by an employee of the United States Government and may be manufactured and used by or for the government of the United States of America for governmental purposes without the payment of any royalties thereon or therefor.

TECHNICAL FIELD

This invention relates generally to power input controls for induction motors, and more particularly to a power factor type motor controller incorporating an induced emf sensing feature utilized in improving system performance.

BACKGROUND ART

In the U.S. Pat. No. 4,052,648 in the name of the present applicant, and entitled "Power Factor Control System for A.C. Induction Motors", there is disclosed a power reduction system for induction motors in which the operating power factor of a motor is monitored, and the effective voltage input to the motor is controlled as a function of the difference between a commanded power factor signal and the operating power factor. In U.S. patent application Ser. No. 199,765, by the same applicant, filed on Oct. 23, 1980, and entitled "Three-Phase Power Factor Controller", there is disclosed a power factor type control system particularly adapted for three-phase induction motors. Further, in U.S. patent application Ser. No. 310,714, by the same applicant, filed on Oct. 13, 1981, and entitled "Motor Power Factor Controller with a Reduced Voltage Stater", there is a disclosed starting circuitry for providing "soft" starting of the motor of a power factor controller system. Although these devices serve to very significantly reduce the energy consumption in lightly loaded motors, maximum savings possible are not always realizable due to many variations among different motors.

SUMMARY OF THE INVENTION

The present invention is concerned with an improved power factor controller (PFC) which provides an increase in energy savings, an increase in the speed of response to a sudden change in load and improves the soft start characteristics of the motor. As explained in more detail below, the invention, in its broadest sense, involves sensing the induced motor emf and deriving therefrom a feedback signal used in controlling the operation of the motor. It is important to note that the circuitry required in producing these improved results generally amounts to less than 1% of the cost of a three-phase PFC and 3% of the cost of a single phase PFC.

According to a preferred embodiment thereof, the invention is incorporated in a power factor controller for an A.C. induction motor of the type comprising electronic switching means (e.g. a thyristor) connected in series with the motor, phase detector means for sensing the motor current and voltage and providing an output proportional to the phase difference between the motor voltage and current; command signal generating means for generating a power factor command signal; and control means, responsive to the output of phase detector means and the power factor command signal, for controlling the switching state of the electronic switching means; and, in general, comprises the provision of means for sensing the induced emf produced by th motor during the time interval in each half cycle when the electronic switching means is in the off state thereof and for producing, in accordance with the induced emf sensed thereby, a feedback signal for use in controlling switching of the electronic switching means. The sensing means preferably senses polarity reversals in the motor voltage waveform caused by loading of the motor and includes a high gain operational amplifier whose output is blocked except during the interval in each half cycle when the induced emf produced during the "off" period of the switching means is of opposite polarity to the voltage during the "on" period of the switching means.

In a preferred embodiment adapted for use with a three-phase motor, the sensing means includes a square wave voltage shaping circuit, connected between the line voltage terminal and an electronic switching circuit, for controlling switching of the electronic switching circuit, a high gain operational amplifier, connected to the motor to neutral voltage terminal through the electronic switching circuit, for amplifying and selectively inverting a voltage proportional to the motor to neutral voltage under the control of the electronic switching circuit, and diode means for blocking the output of the operational amplifier when this output is of a first polarity. The electronic switching circuit preferably includes first and second transistors whose control electrodes are connected to the output of the voltage squaring circuit, each of the transistors being connected in parallel with one input of the operational amplifier. The diode means preferably comprises a diode connected to the output of the operational amplifier. In this embodiment, the power factor controller utilizes three of the phase detector means referred to above and the outputs of these phase detector means are connected to a summing junction. The sensing means further comprises capacitor means connected to this summing junction for storing voltage output of the operational amplifier and for discharging the corresponding voltage responsive to blocking of the output of the operational amplifier. This capacitor means advantageously comprises a capacitor, and a voltage follower for assisting the capacitor in holding the charge thereon.

In accordance with a further feature of the invention as employed with power factor controller including starting circuit means for improving the starting characteristics of said motor, an output of the sensing means is connected to the starting circuit means so as to influence the output thereof in a manner to improve the linearity of speed versus time characteristics of the motor. The starting circuit means preferably includes phase angle feedback circuitry for generating a ramp voltage for controlling speed of the motor relative to time and the output of the sensing means is summed with the ramp voltage. Advantageously, the sensing means includes a diode connected to the output of the above-mentioned operational amplifier for blocking output signals of one polarity and a capacitor, connected to the output of that operational amplifier through the diode, which charges responsive to the starting of the motor and which discharges as the motor comes up to speed.

In another embodiment wherein the electronic switching means comprises, for example, a thyristor, the sensing means is connected across said thyristor to sense voltage thereacross. In this embodiment, the sensing means preferably comprises a first operational amplifier whose inputs are connected across said thyristor and a second operational amplifier for rectifying the output of the first operational amplifier.

In another embodiment, the sensing means comprises an operational amplifier whose inputs are connected through respective oppositely poled diodes to a junction between the motor and the electronic switching means.

Other features and advantages of the invention will be set forth in, or apparent from, the detailed description of a preferred embodiment thereof found below.

DESCRIPTION OF A PREFERRED EMBODIMENT

Figure 1:
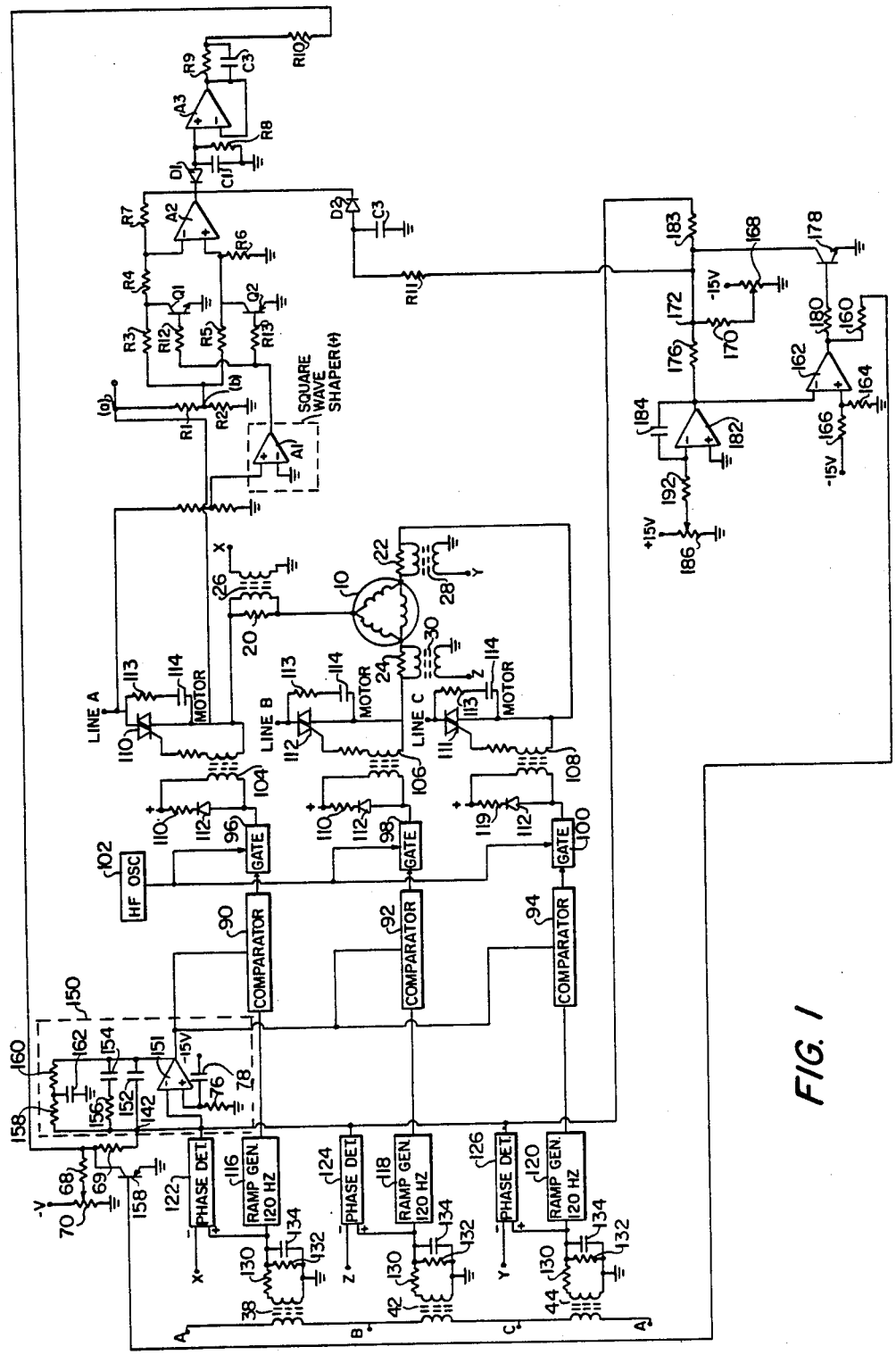
FIG. 1 is a schematic circuit diagram, partially in block form, of a power factor controller incorporating the induced emf sensing circuitry of the invention.

Referring to FIG. 1, a three phase motor 10 is powered through triac devices 110, 112, and 111 from a three phase power line, typically providing 220 (or 440) volt, 60 cycle, A.C. from terminals A, B, and C. Current is sampled by current sampling transformers 26, 28, and 30, shunted by resistors 20, 22, and 24, each of these resistors being connected in series with an input to motor 10. Transformers 26, 28, and 30 are individually connected across one of these resistors (via a primary winding, as shown), and with one secondary terminal grounded, the other secondary terminal (X, Y or Z) provides a discretely phased current signal output. Terminal X is associated with phase A, terminal Z is associated with phase B, and terminal Y is associated with phase C.

A power factor signal, i.e., a signal proportional to the current-voltage phase differential of each of the three phase inputs is obtained, separately, by phase detectors 122, 124, and 126. Phase detector 122 receives a current responsive signal sample from terminal X, representative of the A phase current, and a voltage signal from transformer 38, representative of the A-B phase voltage, and provides a first phase detected output at terminal 142. Phase detector 124 receives a sample from terminal Z, representative of the B phase current, and a B-C voltage sample from transformer 42 and provides a second phase detected output at terminal 142. Phase detector 126 receives a phase C current signal sample from terminal Y, and a C-A phase voltage sample from transformer 44 and provides a third phase detection signal at terminal 142. Resistors 130 and 132 and a capacitor 134 are used in phase shifting the input signal as described in Ser. No. 199,765.

The phase detectors 122, 124, and 126 are identical and can be of the type disclosed in Ser. No. 199,765.

The outputs of phase detectors 122, 124 and 126 are summed at 142 and signal conditioning circuitry 150 is provided to effect signal conditioning of the control signal produced at terminal 142 wherein the direct current character of the signal is made to be compatible with the thyristor trigger circuitry and still have an appropriate frequency response up to on the order of 50 Hz. The control signal is applied to the inverting input of operational amplifier 151 of signal conditioner or integrating circuit 150, together with a power factor command signal supplied through resistor 68 from potentiometer 70. Potentiometer 70 is biased negatively to provide a difference or subtraction signal with respect to the positive signal as developed at the outputs of the phase detectors. Signal conditioning is effected by inverse feedback networks comprising lead-lag components 152, 154, 156, 158, 160 and 162 as described in Ser. No. 199,765.

Thyristor (triac) triggering signals are developed by the comparison of the control signal output of operational amplifier 151 and ramp signals provided by ramp generators 116, 118 and 120. A 120 Hz ramp signal for each phase is developed by one of the conventional ramp generators 116, 118 and 120 responsive to A-B, B-C, and C-A phase voltages from transformers 38, 42 and 44, respectively. The ramp outputs of these generators are separately applied to conventional comparators 90, 92, and 94, together with a control signal from operational amplifier 151. In operation, a comparator provides an output pulse when the level of the control signal intersects the leading edge of a ramp signal. These pulses result in the triggering of the thyristors.

The actual control of the current "turn on" periods for the tyristors is effected by gates 96, 98, and 100, which pass high frequency signals responsive to the outputs of comparators 90, 92 and 94. Gates 96, 98, and 100 are electronic switches and function to effect gating of the high frequency signals (e.g., 10 KHz) from high frequency oscillator 102 through the primary windings of transformers 104, 106, and 108 to the thyristors. A resistor 110 and a diode 112 are connected in series across the primary of each transformer in order to suppress inductive voltages to a safe level consistent with semiconductive circuitry employed. The secondaries of transformers 104, 106, and 108 are connected between the gate and cathode of triac devices 110, 112, and 111. The turn on periods for the triacs follow, for example, the periods of the pulse outputs of the comparators 90, 92 and 94. A resistor 113 and a capacitor 114 are connected in series across the power terminals of each of the triac switches in order to stabilize their operation.

The circuitry described so far corresponds to that disclosed in Ser. No. 199,765 and, for ready comparison, the reference numerals used generally correspond to those used in FIG. 5 of that patent application. In addition, further reduced voltage starter circuitry is employed corresponding to that disclosed in Ser. No. 310,714 and the references used correspond to those used in FIG. 1 of that application. As described in the latter application, in order to insure that motor 10 will not turn "on" before the starting circuit is operative, circuitry is provided for preventing the application of a normal "run" command signal from potentiometer 70 during the entire starting interval. This is accomplished by connecting a PNP transistor 158, collector to emitter, across potentiometer 70 between resistor 68 and a further resistor 69. When transistor 158 is turned "on", potentiometer 70 is effectively shorted out. Control of transistor 158 is effected from an operational amplifier 162 through a resistor 160 connected to the base of transistor 158. A negative output state for operational amplifier 162 is produced by applying a greater negative bias on the non-inverting input than on the inverting input. The bias applied to the non-inverting input is a fixed bias, being a predetermined percentage of a 15 volt supply as divided down by the voltage divider formed by resistors 164 and 166. Initially, the voltage applied to the inverting input of operational amplifier 162 is zero, which is the initial output of a further operational amplifier 182 that forms a start-up ramp generator, and under these conditions, the potential is higher at the non-inverting input of operational amplifier 182. A potentiometer 168, through a resistor 170, provides an initial starting level negative signal to terminal 172 where it is added to a negative going, start-up, ramp signal from operational amplifier 182 through resistor 176.

An NPN transistor 178 is connected emitter-to-collector between a terminal 172 and ground, and provides means for blocking an interfering effect from a starting signal after the starting sequence is complete. Transistor 178 is controlled by an output from operational amplifier 162 through resistor 180 and is initially held "off" during the starting sequence by the negative output of operational amplifier 162.

A capacitor 184 is connected from the output to the inverting input of operational amplifier 182 to form an integrator. A selected positive bias is obtained from a potentiometer 186 connected between a +15 volt terminal and ground. This bias is fed through an input resistor 192 to the inverting input of operational amplifier 182. The result is that, upon the application of a voltage to the circuit, there will initially occur at the output of operational amplifier 182 an essentially zero voltage which ramps down negatively at a selected rate, determined by this bias and the time constant of capacitor 184 and input resistor 192, to achieve a desired rate of motor turn "on" signal. The negative going signal at the output of operational amplifier 182 is fed through resistor 176 to terminal 172 and there added to a voltage from potentiometer 168, fed through resistor 170. This signal is then applied through a resistor 183 to terminal 142 and there summed with the operating power factor (or current-voltage phase angle) signal and applied to operational amplifier 151 to effect an increasing (negatively) control signal which gradually, over a typical period of 5 to 30 seconds, results in raising the effective motor voltage to full voltage. The actual operational control effected by the control signal on the thyristors is discussed in more detail in Ser. No. 310,714.

The output of operational amplifier 182 is also applied, in this case, to the inverting input of operational amplifier 162, and when the output rises to a level which exceeds the level applied to the non-inverting input of operational amplifier 162, the output of the latter switches from a negative state to a positive state. This changed state is fed as a switching potential to transistors 178 and 158 to turn transistor 178 "on" and transistor 158 "off". The result is that transistor 178 prevents any further starting signal from appearing at terminal 172, and transistor 158 unblocks the output of potentiometer 70 to restore normal power factor control for the "run" operation of motor 10.

Figure 2A:
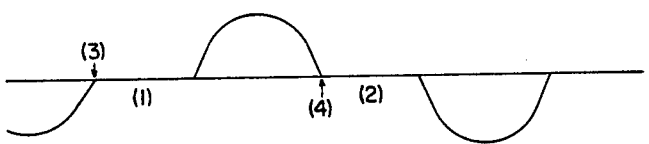
FIG. 2(a) to 2(i) are waveforms used in describing the operation of the system of FIG. 1.
Figure 2B:
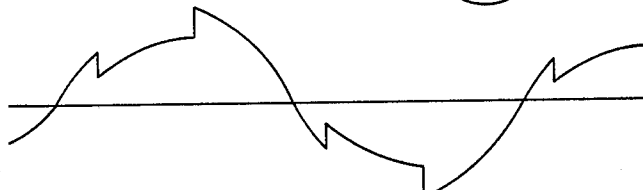

Turning now to the present invention, and referring to the waveforms shown in FIGS. 2(a) to 2(i), the voltage waveform which appears from the motor terminal to neutral of a phase controlled motor is shown in FIG. 2(b) while the current is shown in FIG. 2(a). It is noted that during the periods designated (1) and (2) when the thyristor is off and no current flows, the motor voltage is not zero, but has a finite value. This voltage appearing across the motor terminals when the thyristor (triac) is off is a counter emf which is induced in the stator winding by current flowing in the rotor. The L/R time constant of the squirrel cage rotor is much greater than that of the stator and is typically 0.1 or 0.2 seconds. Hence, even through stator current ceases to flow at points (3) and (4), there is still current flowing in the rotor which induces a voltage in the stator at intervals (1) and (2).

The amplitude of this induced voltage is greatly dependent on two factors, viz., speed, and the point at which current ceases to flow. Since induced counter emf is a function of speed, any tendency for the motor to slow down results in a reduction in the amplitude of the induced voltage. Further, if the triac turns off sooner in the cycle, the reduced stator current then causes less current to be induced in the rotor, and hence, less voltage to be induced during the intervals (1) and (2).

The applications referred to previously describe how the phase angle between the current and voltage decreases when the motor is loaded. If a PFC controlled motor is phased back to achieve maximum energy savings, then the system loses its ability to respond instantaneously to a large sudden change in load. Some savings must be sacrificed if the system is required to respond to a large sudden change in load.

If a phase controlled motor is suddenly loaded and the system is not fast enough to respond, then two things happen. First, the phase angle decreases, which means the triac turns off sooner, resulting in the current termination points indicated by points (3) and (4) moving to the left in FIG. 2(a). As previously indicated, this causes the induced voltage to decrease. Second, the motor will slow down, which also results in a decrease in the induced voltage. Hence, a sudden change in load results in an instantaneous and significant change in the induced voltage. By sensing this voltage and feeding the sensed voltage to the controller, the system can be phased back further to increase savings but will still respond to a sudden change in load to prevent stalling of the motor. In general, this is the basis of the present invention.

Figure 2C:
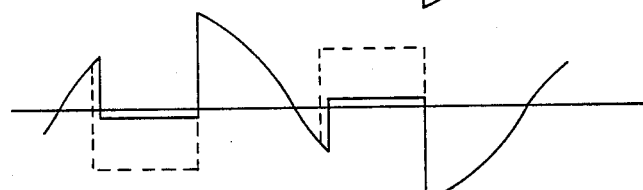
Figure 2D:
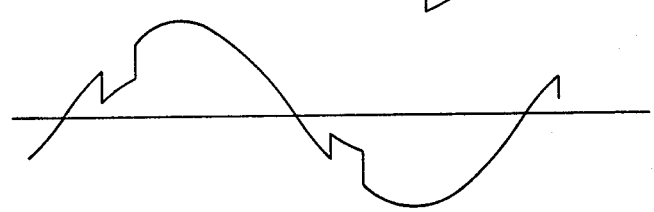
Figure 2E:
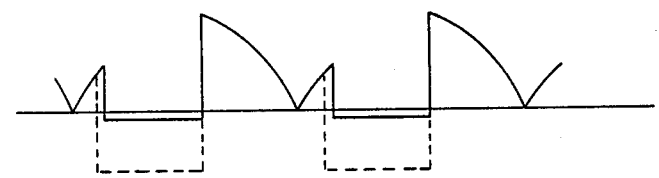
Figure 2F:
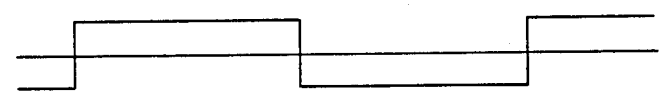

Referring to FIG. 2(c) a typical waveform of the phase to neutral voltage of a phase controlled idling three-phase motor is shown. It will be noted that the induced emf during the off period of the thyristor can actually be of the opposite polarity to the voltage when the thyristor is "on" in each half cycle. This is because the phase to neutral voltage from the other two phases sum to cause this polarity reversal. Under load, after the system has phased up in response to the load, the polarity reversal does not occur, as is indicated in FIG. 2(d). If the idling motor is suddenly loaded, the reversed polarity voltages increase as indicated by the dotted lines in FIG. 2(c).

The circuitry added to the system of FIG. 1 provides for detecting only this reversed polarity voltage and for using this voltage to improve the energy savings and speed of response, while rejecting the remainder of the waveform. Thus, referring again to FIG. 1, operational amplifier A1 is a voltage square wave shaper (+) used in the phase detectors described in Ser. No. 199,765. The voltage indicated at (a) is the motor to neutral voltage. This voltage is padded down at (b) to a compatible level by resistors R1 and R2. The output of operational amplifier A1 is connected through a resistor R12 to the base of a first transistor Q1 and through a resistor R13 to the base of a second transistor Q2. When the output of operational amplifier A1 is positive, as illustrated in FIG. 2 (f), control transistor Q1 is on, thereby preventing any signal from reaching the negative input of a second operational amplifier A2. When the output of operational amplifier A1 is negative, transistor Q2 is on, thereby preventing a signal from reaching the positive input of operational amplifier A2. The values of resistors R3, R4, R5, R6, and R7 are selected so that the gain of operational amplifier A2 is the same for inputs to both its plus and minus terminals. When the output of operational amplifier A1 is positive, operational amplifier A2 amplifies the voltage at (b) with positive gain. When the output of amplifier A1 is negative, amplifier A2 inverts the voltage at (b) and amplifies this voltage with negative gain, resulting in the full wave rectified voltage shown in FIG. 2(e). It will be seen that the only time the output of operational amplifier A2 is negative is during that interval in each half cycle when the induced emf is of the opposite polarity, as previously described. This is the situation that is to be detected.

The positive output of amplifier A2 is blocked by a diode D1, which passes only the negative output. Under sudden load this negative voltage increases instantaneously as indicated by the dotted lines in FIG. 2(e). It will be appreciated that since these negative peaks are near zero value in an idling motor, significant gain can be included in amplifier A2 so that the increase in induced emf resulting from a sudden change in load can be also amplified to increase the effectiveness thereof. This is an important aspect of the invention. The negative pulses from amplifier A2 are passed by diode D1 and instantaneously charge a capacitor C1 to peak values since there is no resistance at the output of amplifier A2. A further operational amplifier A3 is connected as a voltage follower to provide a high input impedance for capacitor C1 allowing capacitor C1 to hold the charge thereon between each half cycle and thereby eliminating ripple. The output of amplifier A3 is fed through the parallel combination of capacitor C3 and a resistor R9, and R10 to amplifier input 142.

With this arrangement, a sudden load will be instantaneously sensed by the induced emf circuitry and a signal produced which is conditioned and fed to the PFC to causing the PFC to respond to the load. Once the PFC has phased up in response to the load, the motor voltage will be of the form indicated in FIG. 2(d) Under these circumstances, no voltage is being applied to capacitor C1 and capacitor C1 immediately begins bleeding off the charge thereon into parallel connected resistor R8. When this occurs, the charge is diminished rapidly, relative to the load duty cycle, to a level where capacitor C1 can accept a charge in response to the next suddenly applied load. The time constant of the RC circuit formed by capacitor C1 and resistor R8 is typically several seconds which is slow relative to the frequencies associated with the PFC/motor control system. Since the induced emf sensing circuitry is rapid in operation in one direction (fast increase, slow decrease), the output signal therefrom can be fed into the PFC control system with a large gain without affecting the stability of the system. The large gain increases the effectiveness of the induced emf in improving performance and, as noted above, this is a significant feature of the invention. This gain is determined by capacitor C3 and resistor R10 while resistor R9 serves to bleed the charge off of capacitor C3.

The circuitry described thus far allows the system to be phased back further for greater energy savings while improving the speed of response to sudden loads. The induced emf is also used in the PFC system of FIG. 1 to improve the soft start characteristics of the motor. The ideal soft start is one where the speed increases linearly with time. With the soft starter circuitry described above, phase angle feedback is used for stabilizing the system. Since the phase angle decreases as the motor speed increases, this causes the applied voltage to increase which, in turn, causes the speed to increase at a greater rate, (other than linearly), with time. While this approach is sufficient for most applications, the system can be improved by feeding back the induced emf signal and summing this signal with the soft start ramp voltage. To this end, a connection is provided from the output of amplifier A2 through diode D2, capacitor C3 and resistor R11 to the ramp output of operational amplifier 182 described above.

Figure 2G:
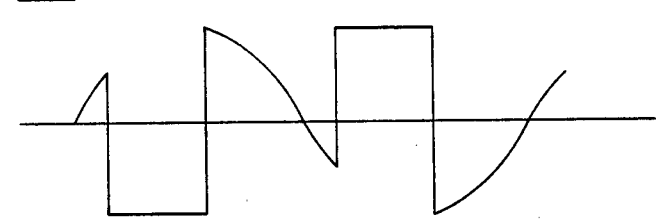

Considering this aspect of the invention in more detail, when a motor is at rest and a phase controlled voltage is applied, the motor voltage waveform is as shown in FIG. 2(g). As the motor speed increases, the inverted voltages at intervals (1) and (2) decrease and finally approach values shown in FIG. 2(d) at rated speed. Hence the pulses produced by amplifier A2 start out large at stall and diminish to zero at the rated speed of the motor. Diode D2 blocks the positive output of operational amplifier A2. Hence capacitor C3 charges to a large voltage when the motor first starts, and this voltage decreases as the motor comes up to speed. This voltage is summed with the starting ramp produced by operational amplifier 182, and thus a large starting voltage is initially commanded. This commanded voltage decreases as the speed increases. This operation causes the applied motor voltage to decrease and counteracts the increase to applied voltage caused by the aforementioned phase angle, which decreases with speed. Thus a more linear speed versus time characteristic is achieved.

Further considering the overall operation of the combined "soft start" circuitry, at the initial turn on of the system, the output of integrator 182 is zero volts. The output of comparator 162 is full negative by virtue of the zero volts appearing at negative input thereof and the negative voltage applied to the positive input thereof through the resistor pad formed by resistors 166 and 164. Under these conditions, NPN transistor 178 will be "off" since the base voltage is negative so that voltage can pass. The PNP transistor 158 will be "on" since the base voltage is negative. This prohibits any voltage from potentiometer 70 or from the output of operational amplifier A2 of the induced emf feedback circuitry of the invention from the input of operational amplifier 151 at summing point 142.

At initial turn on, and for a period typically 20 milliseconds in duration, as determined by the time constant of a capacitor 78 and resistor 76, the output of integrator 151 is driven negative to prevent premature firing of the thyristors. Concurrently, two voltages are being fed to summing point 142, viz., the voltage from potentiometer 168 through resistor 170, and the induced emf signal through resistor R11. These signals command an initial starting current which slowly starts the motor turning. It is to be noted that both of these voltages are negative. The initial amount of starting current as required by different loads can be varied by potentiometer 168. Further, at initial turn on, integrating operational amplifier 182 begins to integrate, i.e., to increase the output voltage thereof, negatively. This output is summed with the other two voltages and increases the motor current as the motor speed increases. It is during this increase in speed that the voltage from the induced emf circuit of the present invention decreases and causes the motor speed to increase more linearly with time. The output of the integrating operational amplifier 182, as determined by capacitor 184 and resistor 192 and the voltage from potentiometer 186, typically increases about one volt per second and the motor typically achieves full speed in 5 to 10 seconds.

After the motor has reached final speed the voltage from operational amplifier 182 exceeds the voltage at the plus input of operational amplifier 162 thereby causing the latter to switch full positive. This operation turns "on" transistor 178 which blocks all starting voltages from summing junction 142. The operation also turns "off" transistor 158 which now allows the PFC command voltage from potentiometer 70 and the induced emf voltage of the invention to be effective.

In an alternate embodiment for sensing the induced emf, the voltage across the thyristor is sensed. This alternative is available because the thyristor voltage is equal to the line voltage minus the motor voltage and thus the induced emf is present in the thyristor voltage.

A typical thyristor voltage for a phase controlled motor is shown in FIG. 1(h). The amplitudes at intervals (1) and (2) decrease when the system phases up in response to an increase in load, and increase as the system phases back when the load is removed. Since the induced emf is zero when the motor is at stall, the thyristor voltage is at its maximum and decreases as the motor comes up to speed. Hence, this voltage can be used to improve soft start as described above. If a suddenly applied load causes any tendency for the motor to slow down, the voltage across the triac rises instantaneously and is used as described above to cause the PFC to respond.

Figure 2H:
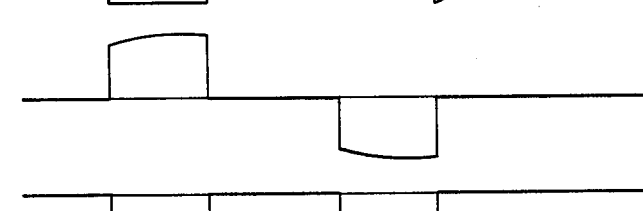
Figure 2I:
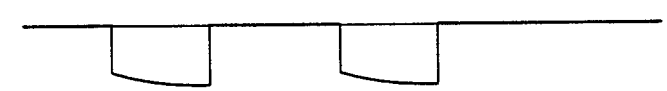

It is to be understood that the technique wherein the voltage across the thyristor is sensed for use in improving performance is applicable to single phase operation as well as three-phase. An operational amplifier (not shown) whose inputs are connected across the thyristor can be used in extracting the thyristor voltage and would produce an output as shown in FIG. 2(h). This output is full wave rectified by a second operational amplifier (not shown) to produce the output shown in FIG. 2(i) which is fed to the cathodes of diodes D1 and D2 of FIG. 1. The basic operation is the same as described above.

Circuitry can also be provided for extracting the induced emf in a single phase motor in the form of an operational amplifier whose inputs are connected through oppositely poled diodes to a junction between the motor and the thyristor. The output of such an operational amplifier, after rectification, would be similar to that shown in FIG. 2(i) and would be used as described above in improving performance. In a specific embodiment, this output would be fed into the input of the integrator used in the system of U.S. Pat. No. 4,052,648.

Although the invention has been described in detail with respect to exemplary embodiments thereof, it will be understood by those of ordinary skill in the art that variations and modifications may be effected within the scope and spirit of the invention.

I claim:

1. In a power factor controller for an A.C. induction motor of the type comprising electronic switching means, having an on state and an off state, connected in series with the motor, phase detector means for sensing the motor current and line voltage and providing an output proportional to the phase difference between the line voltage and current; command signal generating means for generating a power factor command signal; and control means, responsive to said output of said phase detector means and said power factor command signal, for controlling the switching state of said electronic switching means, the improvement comprising sensing means for sensing an induced emf produced by the motor during a time interval when said electronic switching means is in the off state thereof and for producing, in accordance with the induced emf sensed thereby, a feedback signal for use in controlling switching of said electronic switching means.

2. A power factor controller as claimed in claim 1 wherein said sensing means comprises means for sensing polarity reversals in the motor voltage waveform caused by loading of the motor.

3. A power factor controller as claimed in claim 2 wherein said polarity reversal sensing means includes a high gain operational amplifier whose output is blocked except during the said interval in each half cycle when the said induced emf produced during the off state of the switching means is of opposite polarity to the motor voltage during the on state of the switching means.

4. A power factor controller as claimed in claim 3 wherein said motor is a three phase motor and said sensing means includes a square wave voltage shaping circuit, connected between the line voltage terminal and an electronic switching circuit, for controlling switching of said electronic switching circuit, a high gain operational amplifier, connected to the motor to neutral voltage terminal through said electronic switching circuit, for amplifying and selectively inverting a voltage proportional to the motor to neutral voltage under the control of said electronic switching circuit, and diode means for blocking the output of said operational amplifier when said output is of a first polarity.

5. A power factor controller as claimed in claim 4 wherein said electronic switching circuit includes first and second transistors whose control electrodes are connected to the output of the voltage squaring circuit, each of said transistors being connected in parallel with one input of said operational amplifier, and said diode means comprising a diode connected to the output of said operational amplifier.

6. A power factor controller as claimed in claim 4 wherein said power factor controller comprises three of said phase detector means and wherein the outputs of said phase detector means are connected to a summing junction, said sensing means further comprising capacitor means for storing voltage output of said operational amplifier and for discharging said voltage output responsive to blocking of the output of said operational amplifier, and means for connecting the voltage output of capacitor means to said summing junction.

7. A power factor controller as claimed in claim 6 wherein said capacitor means includes a capacitor, and a voltage follower for assisting the capacitor in holding a charge thereon.

8. A power factor controller as claimed in claim 4 wherein said power factor controller includes starting circuit means for improving the starting characteristics of said motor, and wherein an output of said sensing means is connected to said starting circuit means so as to be added to the output thereof to thereby improve the linearity of speed versus time characteristics of the motor.

9. A power factor controller as claimed in claim 8 wherein said starting circuit means includes phase angle feedback circuitry for generating a ramp voltage for controlling speed of the motor relative to time and wherein the said output of said sensing means is summed with said ramp voltage.

10. A power factor controller as claimed in claim 9 wherein said sensing means includes a diode connected to the output of said operational amplifier for blocking output signals of one polarity and a capacitor, connected to the output of said operational amplifier through said diode, which charges responsive to the starting of the motor and which discharges as the motor comes up to speed.

11. A power factor controller as claimed in claim 1 wherein switching means comprising a thyristor and said sensing means is connected across said thyristor to sense voltage thereacross.

12. A power factor controller as claimed in claim 11 wherein said sensing means comprises a first operational amplifier whose inputs are connected across said thyristor and a second operational amplifier.

13. A power factor controller as claimed in claim 1 wherein said sensing means comprises an operational amplifier whose inputs are connected through respective oppositely poled diodes to a junction between the motor and the electronic switching means.

14. A power factor controller as claimed in claim 1 wherein said sensing means has an output and further comprising means for connecting the output of said sensing means to circuit means for controlling starting of said motor.

* * * * *